United States Patent
Nilakantan et al.

(10) Patent No.: US 7,724,670 B2
(45) Date of Patent: May 25, 2010

(54) METHOD AND APPARATUS FOR ACHIEVING DYNAMIC CAPACITY AND HIGH AVAILABILITY IN MULTI-STAGE DATA NETWORKS USING ADAPTIVE FLOW-BASED ROUTING

(75) Inventors: Chandrasekharan Nilakantan, Cupertino, CA (US); Siva V. Kumar, Menlo Park, CA (US); Andrew Leslie Laursen, Auburn, CA (US); Saroop Mathur, Los Altos, CA (US); Gary Michael Jaszewski, Los Gatos, CA (US); Mei-Ying Chan, Los Altos, CA (US)

(73) Assignee: Scalent Systems, Inc., Palo Alto, CA (US)

( * ) Notice: Subject to any disclaimer, the term of this patent is extended or adjusted under 35 U.S.C. 154(b) by 42 days.

(21) Appl. No.: 12/340,386

(22) Filed: Dec. 19, 2008

(65) Prior Publication Data

US 2009/0097406 A1    Apr. 16, 2009

Related U.S. Application Data

(62) Division of application No. 10/692,667, filed on Oct. 24, 2003, now Pat. No. 7,483,374.

(60) Provisional application No. 60/493,054, filed on Aug. 5, 2003.

(51) Int. Cl.
*G01R 31/08* (2006.01)

(52) U.S. Cl. .................. 370/235; 370/389; 370/401

(58) Field of Classification Search .............. None
See application file for complete search history.

(56) References Cited

U.S. PATENT DOCUMENTS

| | | | |
|---|---|---|---|
| 5,495,426 A | | 2/1996 | Waclawsky et al. |
| 5,495,479 A | | 2/1996 | Galaand et al. |
| 5,613,069 A | | 3/1997 | Walker |
| 6,085,238 A | * | 7/2000 | Yuasa et al. ............ 709/223 |
| 6,243,360 B1 | | 6/2001 | Basilico |

(Continued)

OTHER PUBLICATIONS

Bijan Raahemi, "A Load-Balancing Adaptive Routing Algorithm in K-Ary N-Cube Interconnection Networks", Article, 2003, 4pgs, Research and Innovation Center, Alcatel, Canada.

(Continued)

*Primary Examiner*—Duc C Ho
(74) *Attorney, Agent, or Firm*—Sonnenschein Nath & Rosenthal LLP

(57) ABSTRACT

Methods and systems for determining paths for flows within a multi-stage network made up of clusters of processing nodes. The flow paths may be determined without knowledge of whether or not packets of a particular flow will actually traverse specific ones of the clusters within the multi-stage network. In various implementations, the nodes of the multi-stage network may be coupled to one or more physical network switches through respective physical interfaces and a virtual connectivity grid superimposed thereon and configured through the use of a flow routing framework and system management framework to group the nodes into a number of clusters. The nodes of each cluster are configured to perform similar packet processing functions and the clusters are interconnected through virtual networks to which the nodes are communicatively coupled via virtual interfaces overlaid on top of the physical network interfaces.

35 Claims, 10 Drawing Sheets

U.S. PATENT DOCUMENTS

| | | |
|---|---|---|
| 6,272,522 B1 | 8/2001 | Lin et al. |
| 6,363,077 B1 | 3/2002 | Wong et al. |
| 6,424,992 B2 | 7/2002 | Devarakonda et al. |
| 6,614,758 B2 | 9/2003 | Wong et al. |
| 6,742,044 B1 | 5/2004 | Aviani et al. |
| 6,751,191 B1 | 6/2004 | Kanekar et al. |
| 2001/0034792 A1 | 10/2001 | Swildens |
| 2002/0083194 A1 | 6/2002 | Bak et al. |
| 2002/0101822 A1 | 8/2002 | Ayyagari et al. |
| 2002/0124104 A1 | 9/2002 | Rappaport et al. |
| 2002/0141412 A1 | 10/2002 | Wong et al. |
| 2002/0176359 A1 | 11/2002 | Durinovic-Johri et al. |
| 2003/0023750 A1 | 1/2003 | Basturk |
| 2003/0037165 A1 | 2/2003 | Shinomiya |
| 2003/0058880 A1 | 3/2003 | Sarkinen et al. |
| 2003/0189947 A1 | 10/2003 | Beshai |
| 2003/0227917 A1* | 12/2003 | Maher et al. ............. 370/392 |
| 2004/0037278 A1 | 2/2004 | Wong et al. |
| 2004/0117794 A1 | 6/2004 | Kundu |
| 2004/0133619 A1* | 7/2004 | Zelig et al. ............. 709/200 |

OTHER PUBLICATIONS

Henrik Abrahamsson, Bengt Ahlgren, Juan Alonso, Anders Andersson and Per Kreuger, "A Multi Path Routing Algorithm for IP Networks Based on Flow Optimization", Article, 2002, 10pgs, SICS-Swedish Institute of Computer Science.

Yi-Ju Chao and Blaise Morton, "A Framework for Dynamic Routing and Feedback Regulation of Packet-Switched Networks", Article, pp. 272-301, Telecommunications Network Design and Management.

\* cited by examiner

METHOD AND APPARATUS FOR ACHIEVING DYNAMIC CAPACITY AND HIGH AVAILABILITY IN MULTI-STAGE DATA NETWORKS USING ADAPTIVE FLOW-BASED ROUTING

RELATED APPLICATIONS

The present application is a Divisional of U.S. application Ser. No. 10/692,667 filed Oct. 24, 2003 which is a Non Provisional of and claims the priority benefit of U.S. Provisional Application No. 60/493,054, filed Aug. 5, 2003, incorporated herein by reference.

FIELD OF THE INVENTION

The present invention relates to methods and systems for adaptively routing packet flows in a multi-stage data network that includes various packet processors that perform specialized functions at each stage, in order to achieve high availability and dynamic capacity management uniformly across all stages of that network.

BACKGROUND

Enterprise data networks traditionally comprise data networking equipment such as hubs, switches, bridges and routers. These networks have evolved over the years, and are continuing to evolve, to include special purpose appliances that perform highly specialized packet processing functions servicing a range of enterprise needs from security to traffic management to content-aware/application-aware data routing to application acceleration, just to name a few. These special purpose appliances typically support industry-standard local area network connection ports (e.g., Ethernet ports). Consequently, the interconnection between these appliances is achieved using traditional data networking equipment such as hubs, bridges, switches and routers.

In such networks, data traffic flows serially from one appliance to the next, thus creating a multi-stage network. Often, different traffic flows, as distinguished by such criteria as the source and destination of the data traffic or the application to which it relates, are required to be processed by different sequences of special purpose equipment. The operator of the network accomplishes this flow assignment either by using redundant sets of the specialized equipment and hardwiring interconnects between them or by inserting data traffic routers or dispatchers at the beginning and end of each stage of the multi-stage network. These configurations result in inflexible network topologies which are inherently not conducive to supporting the inclusion of new stages (particularly dynamically for some subset of the traffic flows), dynamic expansion of the packet processing capacity of any one or more stages, interchangeability of hardware across stages, re-use of the same hardware to perform different specialized functions at different instances in time based on operational criteria such as time of day, changes in traffic conditions, congestion in one or more stages, and so on. However, operators of present day enterprise networks require this flexibility in order to respond appropriately to changes in network security requirements, volume and types of traffic flows, business requirements, the introduction of new packet processing functions or changes to existing packet processing functions.

SUMMARY OF THE INVENTION

In various embodiments, the present invention includes methods and systems for determining, in a centralized fashion, paths for flows within a multi-stage network made up of clusters of processing nodes, and encoding node selection information representing flow path decisions for all clusters of the multi-stage network in packets of each flow within the multi-stage network. In alternative arrangements, however, flow paths may be determined in a distributed fashion. In either case, the node selection information may be encoded in the packets by replacing other header information in the packets with the node selection information, or by appending the node selection information to the packets. Prior to determining paths for the flows, the flows are classified by type.

The paths of the flows may be determined without knowledge of whether or not packets of a particular flow will actually traverse specific ones of the clusters within the multi-stage network. Individual nodes of each cluster may be selected for inclusion in the paths according to load balancing criteria such as a round-robin selection methodology, a weighted round-robin selection methodology, or on the basis of real time information from the nodes of the multi-stage network as to current load conditions.

Actual flow routes for the packets may be determined on a node-by-node basis as the packets traverse their flow paths within the multi-stage network. Often, these actual flow routes will not include all of the clusters specified in the predetermined flow paths. Nevertheless, information regarding the actual flow routes taken by the packets may be used in determining subsequent flow paths for new flows.

The nodes of the multi-stage network may be coupled to one or more physical network switches through respective physical interfaces and a virtual connectivity grid superimposed thereon and configured through the use of a flow routing framework and system management framework to group the nodes into a number of clusters. The nodes of each cluster are configured to perform similar packet processing functions and the clusters are interconnected through virtual networks to which the nodes are communicatively coupled via virtual interfaces overlaid on top of the physical network interfaces. In some cases, the nodes may each comprise single board computers of a blade server.

The present system may be implemented in a variety of ways. For example, some implementations may make use of a plurality of stand-alone general purpose and/or special purpose computers as the nodes, and local area network (LAN) switches that support virtual local area networks (VLANs) and jumbo frames as the one or more physical switches. Other implementations may use one or more blade servers, where the blades act as the network nodes. Still other implementations may include both blade servers and general and/or special purpose computers.

Regardless of which configuration is used, flow management software at the nodes may be configured to cause the computers/blade processors to adaptively route data flows through the multi-stage network defined by the virtual connectivity grid, wherein each stage of the multi-stage network includes a cluster of similarly configured application programs performing one or more network services. In addition, at least one of the computers/blades may store resource management and provisioning software and the remaining computers/blades may store provisioning agent software that is configured to cause the those computers/blades to adaptively provision a required capacity of one or more network services as driven by application demand, network performance or application response time. Provisioning may be performed via human interaction through a graphical user interface using icons that represent the nodes and the virtual interfaces and creating interconnections between them, and/or through a programmatic interface using data records that provide attributes of the nodes and the virtual interfaces and specifying desired interconnections between them.

Still another embodiment of the present invention provides for establishing a virtual connectivity grid configured to permit arbitrary interconnections among a first number of computer systems within a computer network, each of the computer systems being communicatively coupled to respective ports of one or more physical network switching devices, through a second number of virtual links that emulate physical network connectivity mechanisms as a result of configurations of one or more virtual networks (VLANs) overlaid on ports of the physical network switching devices. The virtual links may emulate a cable that provides point-to-point connectivity (which may be unidirectional or bidirectional) between two of the computer systems; a cable that provides point-to-multipoint connectivity (unidirectional or bidirectional) between a root one of the computer systems and a plurality of leaf ones of the computer systems; a hub that provides multi-access, broadcast capable connectivity to a plurality of the computer systems, each operating in either a promiscuous or non-promiscuous mode; a switch that provides multi-access, broadcast capable connectivity to a plurality of the computer systems while providing unicast traffic isolation; and/or a transparently bridged connection between a network external to the virtual connectivity grid and a plurality of the computer systems, the bridged connection providing data path transparency for interactions between devices within the network external to the virtual connectivity grid and the plurality of the computer systems.

Prior to transmission across a virtual link a packet may be modified so as to have its original header information contained therein appended to an end of the packet to allow new header information to be substituted for the original header information. The new header information may include flow path decision information for the packet within the virtual connectivity grid. In addition, authentication information serving to identify which of the computer systems is transmitting the packet may be appended to the packet. In such cases, upon reception at one of the computer systems the packet's original header information may be restored.

Yet another embodiment provides for determining, in a centralized fashion, paths for flows within a multi-stage network, and encoding flow path and node selection information in each packet of each of the flows. The node selection for each flow may be made for each cluster of nodes of the multi-stage network without knowledge of which path a respective flow will actually take. The flow path and node selection information may be encoded in or appended to the packets in the manners described above. Prior to determining the paths for the flows, the flows may be classified using a set of information present in the packets and according to criteria established by a network administrator, and the flow paths may be assigned based on policies set by the network administrator. Similar operations may be performed in a distributed fashion at each node of a multi-stage network, in which case only node selection information need be encoded in each packet of each respective flow.

Still other embodiments allow for replicating, at a node of a multi-stage network in which nodes are grouped into clusters of nodes having similar application functionality, an entire flow, in both directions, and designating a flow path for a resulting replicated flow that is different than an original flow path for an original flow from which the replicated flow was produced. The replicated flow may be terminated at a terminating node that receives both the replicated flow and the original flow and may record the contents of the replicated flow and the original flow for analysis.

BRIEF DESCRIPTION OF THE DRAWINGS

The present invention is illustrated by way of example, and not limitation, in the figures of the accompanying drawings, in which.

DETAILED DESCRIPTION

Figure 1:
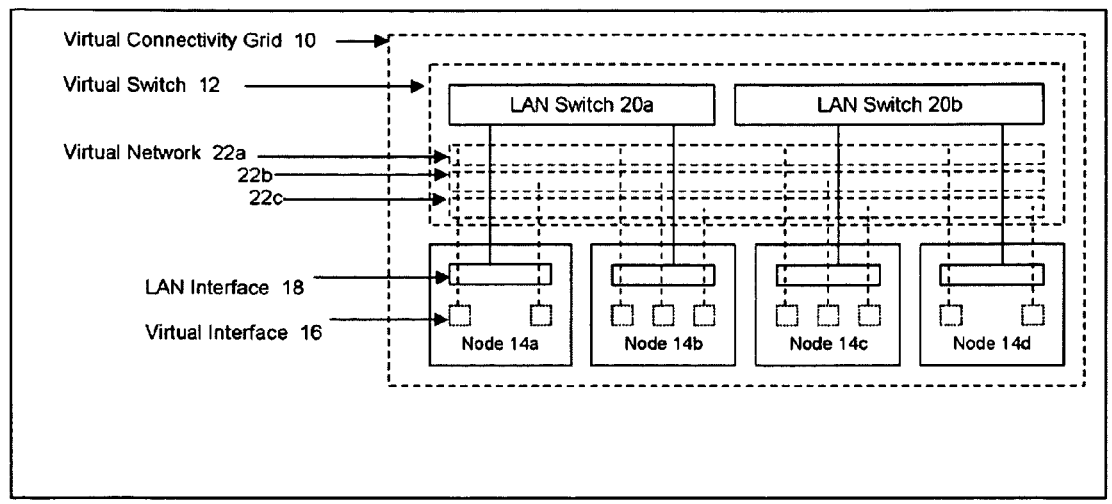
FIG. 1 illustrates a virtual connectivity grid for nodes of a multi-stage network configured in accordance with an embodiment of the present invention.

Described herein are methods and systems for adaptively routing packet flows in a multi-stage data network that includes various packet processors (nodes) that perform specialized functions at each stage. These methods and systems provide for improved processor availability and dynamic processor capacity management uniformly across all stages of the network. Also described is an apparatus that embodies the present methods and that employs general purpose computer hardware that can be used interchangeably to deploy any of the specialized functions required for each processing stage of the multi-stage network. A system is described that combines such an apparatus with other specialized equipment, specifically designed to perform the packet processing functions required for one or more stages of a multi-stage network, to achieve the high-availability and dynamic capacity management throughout the network, including the stages that employ specialized equipment. Collectively, these methods and systems enable a comprehensive and scalable solution to the problem described above.

The main components of the present system include:
 a. A virtual connectivity grid.
 b. Services and system nodes.
 c. A flow routing framework.
 d. A system management framework.

It should be remembered, however, that the descriptions of these components provided herein are exemplary only. That is, various presently preferred implementations of these system components are described in order to familiarize the reader with the concepts embodied in the present invention. These descriptions are not meant to be comprehensive in terms of all possible implementations of multi-stage networks that employ the methods and features of the present invention and should not be regarded as such. Instead, the written descriptions presented herein should be viewed as providing a full, clear, and concise explanation of the manner and process of making and using the present invention, but it is the claims which follow this description that should be viewed as particularly pointing out and distinctly claiming that which the present inventors regard as their invention.

In furtherance of the goal of providing a clear explanation of the present invention, the following terms are used herein:

i. An INODE is an ingress/egress node.

ii. An ANODE is an application node.

iii. An MNODE is a management node.

iv. An FNODE is a flow management node (e.g., a dedicated node, an INODE or an ANODE configured to perform flow management functions as described below).

v. A Flow is a series of packets that are exchanged between two entities (e.g. a client and a server) within an application context (e.g., a transaction, an application session, etc.).

vi. Flow Management Modules are resident in all FNODEs connected to external networks.

vii. Flow Classification is the process by which individual flows are identified within a multiplexed stream of packets.

viii. A Flow Path defines the sequence in which the network entities process the packets in terms of application clusters (or virtual networks).

ix. A Flow Route defines the sequence in which the network entities process the packets in terms of particular nodes within application clusters (or virtual networks).

x. Flow Path Assignment is the process by which flows are directed to a specific path based on static or dynamic criteria.

xi. Flow Replication is the process by which an exact replica of a flow (a clone) is created and a distinct flow path is created for the replicated flow.

xii. Flow Distribution is the process by which a node selects the next hop node, e.g., from a list of functionally equivalent nodes, to which all packets of a particular flow will be forwarded. Next hop node selection may be centralized or distributed.

xiii. Adaptive Routing is a type of flow routing in which the next hop decision is based on dynamically changing metrics, such as node resource utilization.

xiv. Static Routing is a type of flow routing in which the next hop decision is based on packet parameters, such as flow ID and packet type.

xv. Centralized Next Hop Selection is a process in which a flow management module, such as in an INODE that acts as an entry point for a flow, sets up an end-to-end route for the flow.

xvi. Distributed Next Hop Selection is a process in which each node makes a local determination of which node to use as the next hop.

xvii. A Cluster ID is a unique number assigned by the MNODE to each cluster of ANODES, FNODES and INODES.

xviii. A Node ID is the number assigned by the MNODE to each node of a cluster. This number is unique within the cluster. Once assigned, this Node ID does not change until the node is taken out of the cluster.

xix. A Topology is the set of all clusters in the system, all currently active nodes in those clusters and the interconnects between the clusters. Topology changes when a node fails and changes again when the node restarts. Topology can also be changed by an administrator by modifying a flow path or by adding or removing new nodes into a cluster.

xx. A Topology ID is a number assigned by the MNODE to the system topology.

A. Virtual Connectivity Grid

To understand the connectivity grid, and the resulting flow distribution methodologies described herein, it is helpful to understand that one of the goals of the present invention is to create a framework for managed traffic flows between and among multiple network nodes. That is, rather than assembling redundant sets of specialized network equipment and hardwiring interconnects between them or inserting data traffic routers or dispatchers at the beginning and end of each stage of the multi-stage network, as was done in the past, the present invention seeks to create a flexible overlay on top of the network nodes, which overlay allows for dynamic flow path assignment and routing according to the needs of different flows and current network conditions. Thus, the virtual connectivity grid is a logical abstraction constructed in software directly over one or more physical local area network (LAN) switches (e.g., Ethernet switches).

Referring then to FIG. 1, the connectivity grid 10 consists of a central virtual switch 12 and a plurality of nodes 14a, 14b, 14c, 14d (etc.), each node 14 connecting to the grid 10 using one or more virtual interfaces 16. These virtual interfaces 16 are logical abstractions constructed in software directly over the physical LAN interface 18 supported by the node 14. The physical interfaces 18 provide connectivity to the physical LAN switches 20a, 20b, etc., which collectively are spanned by one or more forms of virtual connectivity, such as virtual switch 12.

The virtual switch 12 provides full mesh connectivity, capable of connecting any node 14 to one or more other nodes, as long as all the nodes are part of the virtual connectivity grid 10 managed by the switch. As discussed below, other forms of connectivity are possible through the use of different virtual links between nodes 14. Each connectivity format supports a set of command and control messages that can be used to logically partition the grid into virtual networks 22a, 22b, 22c, etc. Each node 14 supports a set of command and control messages that can be used to create virtual interfaces 16 and connect them to virtual networks 22. Virtual networks 22 can then be used for unidirectional or bidirectional traffic flows.

In order to make use of virtual networks 22 in this fashion, it is preferable that the LAN switches 20 support VLAN tagging. If the switches 20 do not offer such support, however, the connections can be exported, one-for-one, to an external switch that does provide such support. Physically, each node 14 is connected to a port on the LAN switch 20 and nodes of similar processing function are grouped together in clusters. When a path between clusters is needed, VLAN tagging is used to create unique virtual links therebetween. The virtual links thus establish a logical connection between the clusters of nodes and the virtual networks 22 represent the different virtual links needed to provide the desired cluster connectivity.

Note that one could establish a system in which a single virtual network is used and all network traffic is passed across it. This solution, however, would be less than optimal, because not all of the nodes/clusters need to process all of the network traffic. Thus, nodes would be continually receiving and dropping unnecessary packets, thereby wasting processing resources.

Instead then, each node 14 is assigned one or more virtual interfaces 16 with different VLAN tags for connecting to different virtual networks 22 according to the node's connectivity needs. The VLANs represented by these tags are used in a unidirectional (i.e., transmit or receive but not both) fashion so that on each physical interface 18 a node ends up having one or more transmit VLANs and one or more receive VLANs. This abstraction is hidden from the node's application layer software, which simply sees a single Ethernet port in the conventional fashion, and allows for traffic isolation.

Thus, the connectivity grid 10 provides the framework for virtual links between nodes 14. Various types of virtual links may be supported, for example:

a. External links. An external link may be regarded as a link between one or more nodes 14 and an external port on a switch 20 (e.g., as specified by a user). The external port may operate in a VLAN tagged or untagged mode. If the external interface is untagged, the port on the switch 20 to which it connects will be configured with a unique VLAN assigned to that interface. Otherwise, the port operates in tagged mode and allows VLANs to pass through. VLAN tagged mode is thus needed if multiple external links (i.e., subnets) are to be supported over a single external port.

b. Virtual cable. A virtual cable is a point-to-point link between two nodes 14 or clusters of nodes, or between a node and a cluster of nodes. Node clusters are discussed in greater detail below.

c. Virtual switch. As indicated above, a virtual switch 12 provides conventional switched Ethernet connectivity between all member nodes of the virtual link, including multicast/broadcast delivery to all members, periodic flooding, and unicast isolation.

d. Virtual hub. A virtual hub provides hub-like connectivity between all member nodes 14. One or more member nodes of a virtual hub can be configured to operate in a "virtual promiscuous mode", allowing those nodes to receive all packets sent by all other nodes on the virtual hub. Conventional Ethernet switches do not provide for such "snooping" of unicast traffic for an arbitrary set of VLANs configured on one or more ports of that switch. In the case of a non-promiscuous mode node, unicast packets not matching the node's media address controller (MAC) address will be ignored. The use of such virtual hubs allows for the node clustering described below.

Figure 2A:
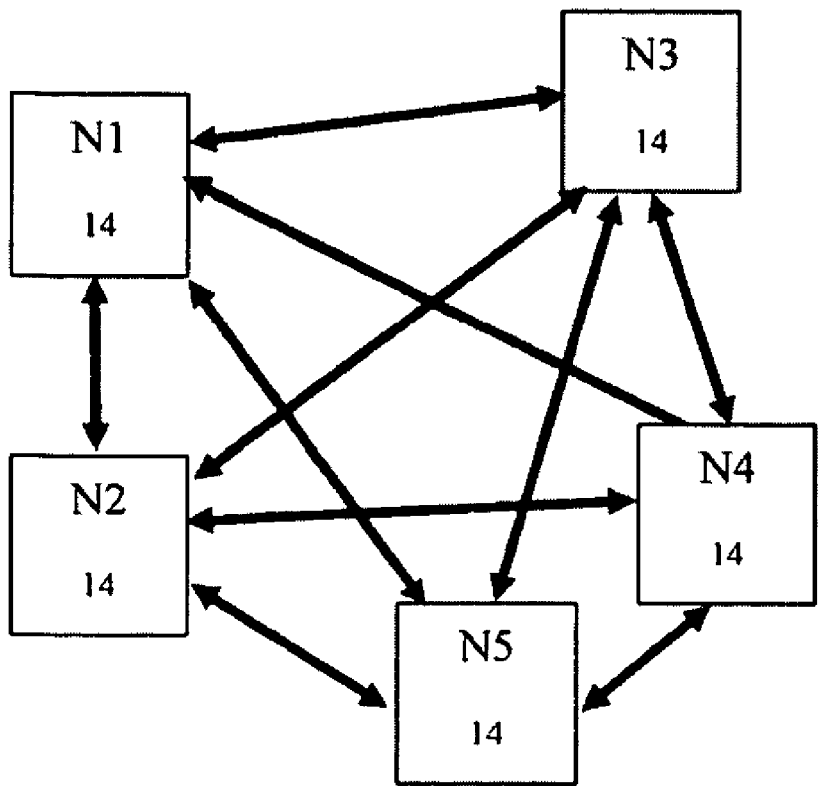
FIGS. 2A-2F illustrate various node interconnections that may be achieved using the virtual connectivity grid of the present invention.
Figure 2B:
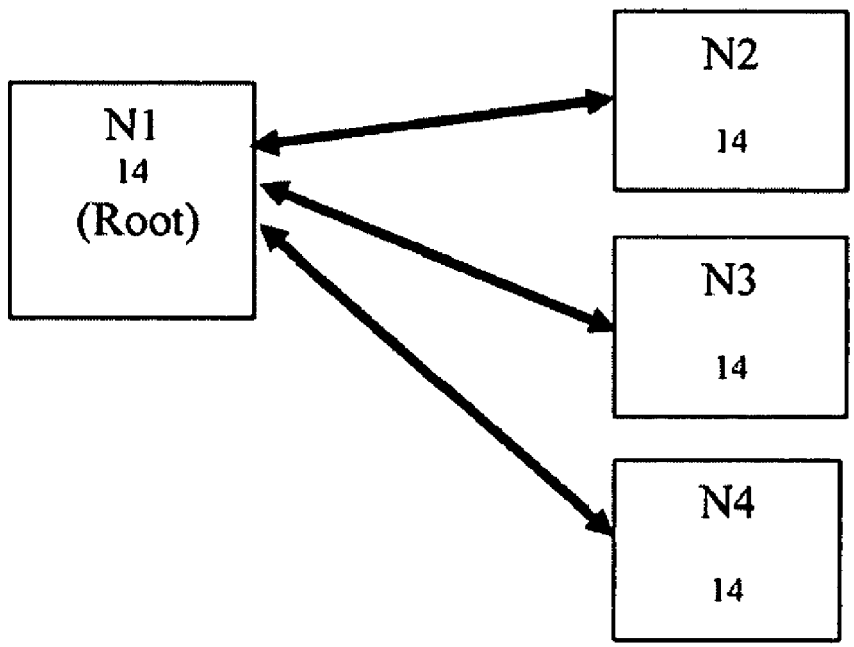
Figure 2C:
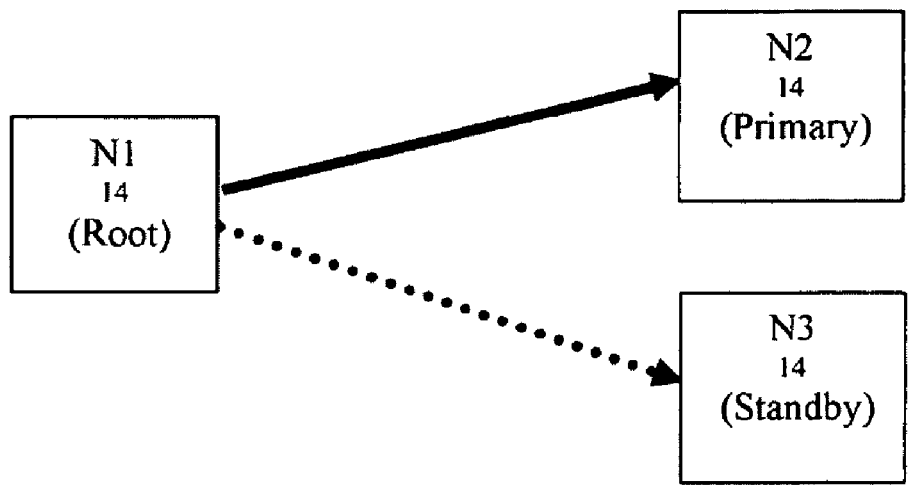
Figure 2D:
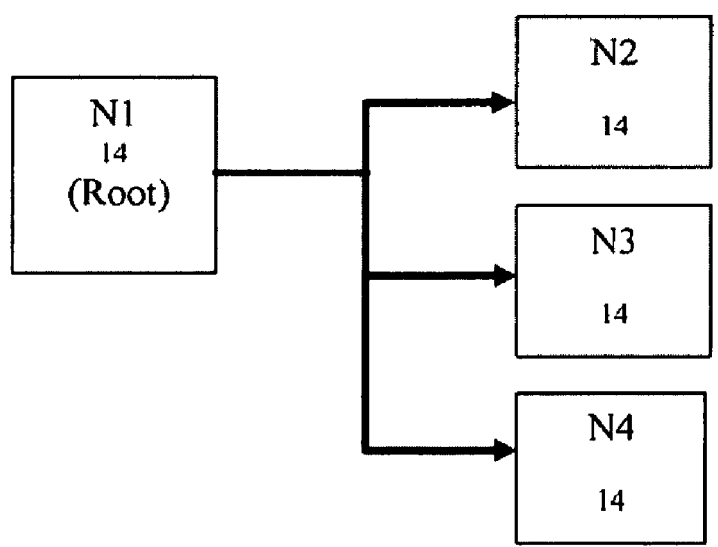
Figure 2E:
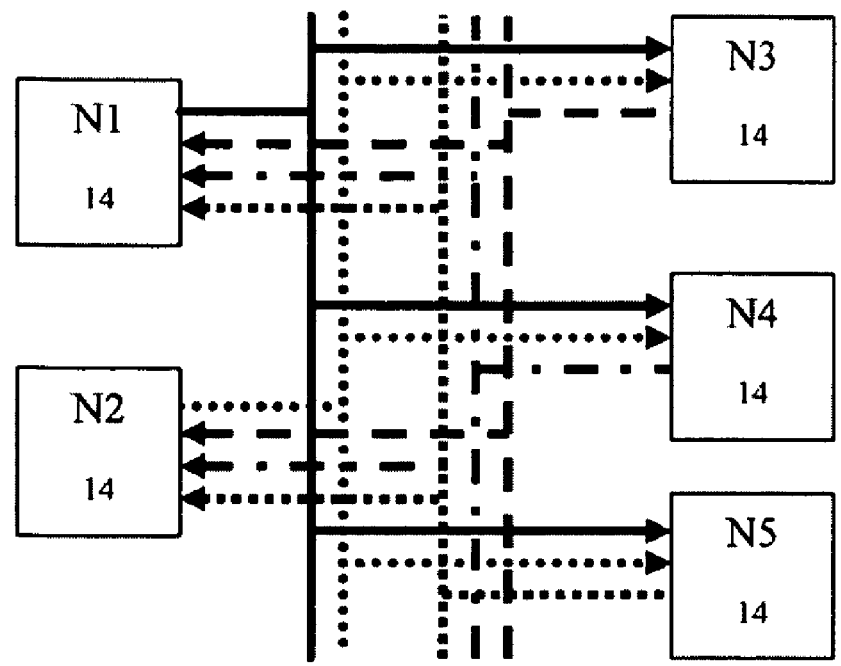
Figure 2F:
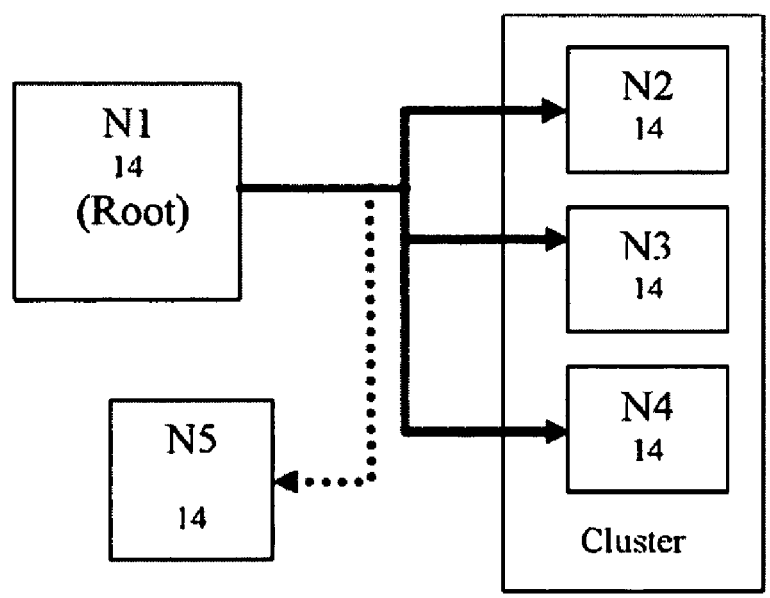

The various types of virtual links provide for various forms of node connectivity, including:

a. Multipoint-to-Multipoint (or full mesh) connectivity between designated nodes. Illustrated in FIG. 2A, this type of connection provides standard switched Ethernet connectivity between all member nodes of the virtual link, including multicast/broadcast, periodic flooding, and unicast isolation. Multipoint-to-Multipoint connections may be used for control paths.

b. Point-to-Multipoint (or star) connectivity between a designated root node and one or more leaf nodes (leaf-to-leaf connectivity is prevented). Illustrated in FIG. 2B, a point-to-multipoint virtual link allows flows to be exchanged between a designated root node and the remaining nodes assigned to the link—which become leaf nodes. This type of virtual link differs from a standard VLAN in that a leaf node does not see flooded, broadcast or multicast packets from other leaf nodes. A Virtual Hub feature is an optional mode of a point-to-multipoint virtual link. In virtual hub mode, all packets from the root node are replicated to the leaf nodes, regardless of whether the destination MAC address is unicast, multicast or broadcast. This provides the capability for one or more leaf nodes to perform "shadow" processing or monitoring of flows being processed by another leaf node in the cluster (e.g., in order to provide backup capability). Transparent clustering makes use of this feature.

c. Point-to-Dualpoint (or resilient link) connectivity between three nodes. Here one node is designated as a root node, a second node designated as primary node and the third node is designated as a standby node. If all nodes are operational, connectivity is enabled between the root and the primary nodes. If the primary node fails, connectivity is enabled between the root and the standby node. Illustrated in FIG. 2C, this type of virtual link provides automatic cutover to a standby node in the event that the primary node fails.

d. Clustered Link. A clustered link (see FIG. 2D) supports unidirectional flows from a root node to a cluster of downstream nodes. All packets sent from the root node are replicated to all nodes in the cluster. Any unicast packet sent from the root is broadcast to all cluster nodes. Packet ingress processing in a receiving node substitutes the node's specific MAC address in the destination field (this technique requires that a unicast indicator be embedded in the packet to indicate that the address needs to be replaced on ingress); multicast and broadcast packets are unchanged.

e. Cluster Connections. As illustrated in FIG. 2E, connections between clusters and adjacent nodes may make use of clustered virtual links.

f. Replicated links may also be used. Illustrated in FIG. 2F, a replicated link provides the capability to place a "tap" onto any existing unidirectional link. A node receiving unicast packets on a replicated link will see its own MAC address in the destination MAC address field (similar to a clustered node).

All virtual links are isolated from each other and from all other internal and external interfaces in the system. Virtual links may be created via a management console (discussed below), for example using a graphical user interface with simple drag and drop icons representing connections between nodes and node clusters. The virtual links may also be created programmatically using data records that provide attributes of the nodes and the virtual interfaces and specifying desired interconnections between them. Once created, the virtual links are stored in a data store (e.g., a data base). The data store acts as a repository for information about the virtual links (e.g., attributes such as link type, link ID, VLAN ID, etc.). A virtual link manager application at the MNODE may be responsible for maintaining this data store and managing the configuration of the virtual links within the connectivity grid 10. Virtual link agents at each node 14 may then communicte with the virtual link manager to construct and delete their virtual links accordingly.

Figure 2G:
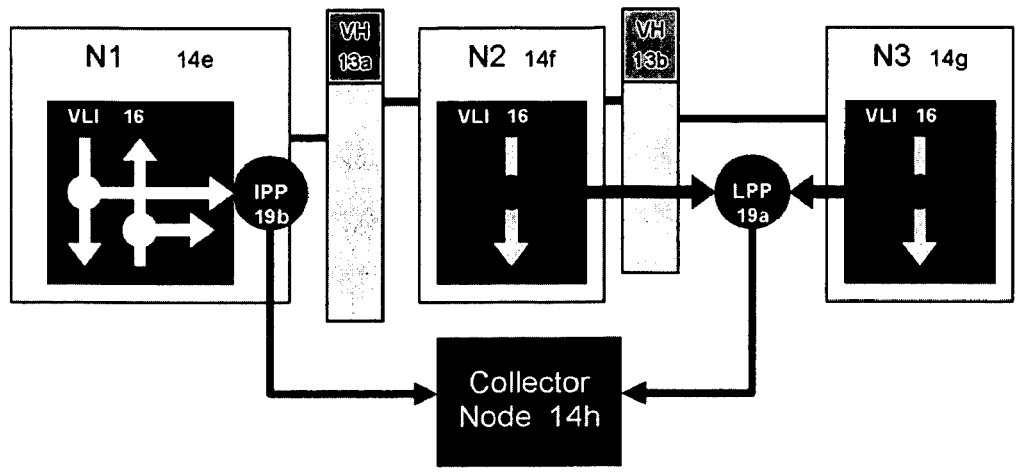
FIG. 2G illustrates a virtual probe feature which may be implemented in accordance with an embodiment of the present invention.

One other form of virtual link that bears mention is the virtual probe, which may be used to provide connectivity for diagnostic applications such as a network analyzer or remote monitor (RMON) application. FIG. 2G illustrates two types of virtual probe connections: a link probe and an interface probe. In the illustration each node 14e, 14f and 14g, supports one or more virtual link interfaces (VLI) 16. Virtual hubs 13a and 13b are used to interconnect nodes N1 and N2 and nodes N2 and N3, respectively.

The virtual probe consists of a collector node 14h and one or more probe points 19. A probe point can be placed on a virtual link, to create a link probe point 19a, or a virtual link interface, to create an interface probe point 19*b*. Multiple probe points can be configured to support applications capable of multi-interface stream correlation.

A link probe point 19*a* is configured by placing the probe point on a virtual link and simulates an in-line or hub-style probe, wherein all packets sent by all interfaces are captured. An interface probe point 19*b* is configured by placing the probe point on a virtual interface 16 and simulates a host-based "shim" probe, wherein all packets received from and sent to an interface are captured. The collector node 14*h* presents a single data link interface to a client application, such as an RMON probe, which operates as a physical network interface in promiscuous mode as though the collector node 19 were on a hub connected to all virtual links being probed. In one application the collector node's interface delivers all collected packets as they were delivered to external interfaces and applications (i.e., by restoring the packet's original MAC addresses and removing any inserted flow descriptors (see below for a description of flow descriptors)). In alternative applications the interface can be configured in a "raw mode", wherein packets are delivered as sent and/or received by a virtual link driver in the probe point 19. For probing packet flows to and from clustered nodes, probe points 19 may be placed on individual member nodes of clusters.

To provide for the connectivities described above, VLAN identifiers (VLAN IDs) assigned to the virtual links must be managed so as to avoid conflicts with other resources. For example, in the case of external links (see below) operating in tagged mode, user assignment of VLAN IDs may be required to avoid conflicts with external devices such as routers. Otherwise, VLAN IDs may be selected from a reserved block of VLAN IDs and assigned according to VL type or industry standard conventions.

In addition to VLAN management, MAC addresses for external links, virtual cables and virtual hubs must also be managed to achieve data path transparency. MAC address management is not required for virtual switches, which operate natively. In some embodiments, virtual hubs may be treated in the same fashion as virtual cables when it comes to MAC address management. The following table provides an example of MAC addresses which may be used in various embodiments of the present invention.

TABLE 1

MAC Address Types

| Address Type | Abbreviation | Description |
|---|---|---|
| NIC Address | Mn | The vendor configured MAC address of the network interface card (NIC). The NIC Address is used natively for virtual switch operation. For virtual link interfaces (VLI) other than external link VLIs, the NIC Address is used as the source MAC address on egress form a node. |
| VLI Address | Mv | This is the system assigned MAC address of the VLI and is configured only for VLIs connected to virtual hubs. The VLI address is created with the OUI portion (the first 3 bytes) set to a designated identifier issued by a industry recognized standards body (e.g., IEEE), and the station portion (last 3 bytes) set to a value created from a Cluster ID and a VLAN ID assigned to the virtual link. The VLI Address is exposed to all applications using the VLI and external interfaces resolving the address on the VLI (naturally resolved by the address resolution protocol (ARP) process in the node). |
| Broadcast Address | Mb | If the VLI is a member of a virtual hub, all packets are sent with the destination MAC set to the Broadcast Address. Note, a multicast address could be used, however, this would require multicast registration with the driver. |

MAC addresses are processed by a virtual interface 16 on a virtual hub during packet ingress to and egress from a node 14. During packet ingress, the virtual interface 16 delivers all packets to an external link bridge module unchanged in cases where the virtual link is an external link. For an internal link, prior to delivering the packet to any applications the virtual interface 16 copies the original packet address from the packet's flow descriptor to the MAC header (in case the application is performing any layer-2 functions) and hides the flow descriptor. Flow descriptors are identifiers that provide an in-band mechanism for distributing networking parameters associated with virtual link connectivity and flow management and are described in detail below.

During packet egress, in the case of external links the virtual interface 16 will copy the original MAC address from the packet's flow descriptor and add it to the packet header. For internal links, the virtual interface 16 will use the NIC Address for the source address and set the destination address to the Broadcast Address. The requested source and destination addresses are also copied to the packet's flow descriptor.

B. Services and System Nodes

Figure 3:
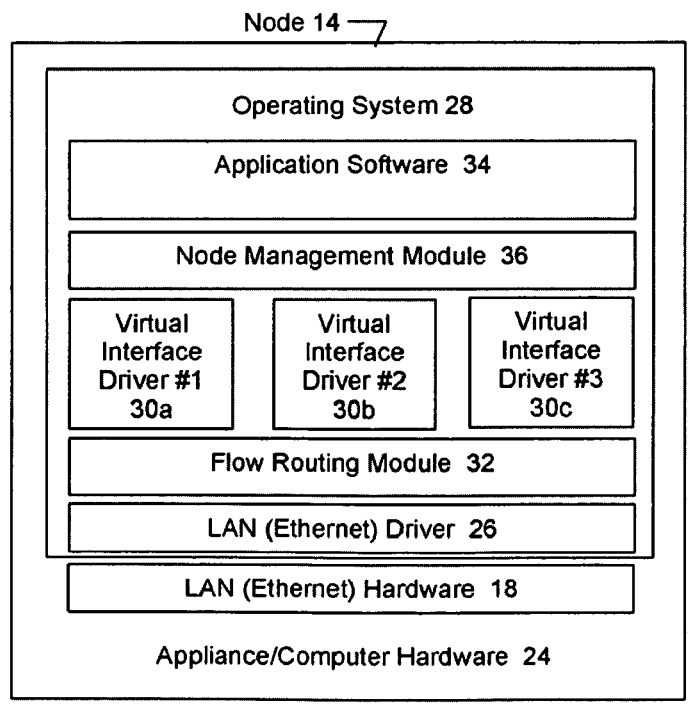
FIG. 3 illustrates general features of a node of a multi-stage network, such node being configured with virtual interface drivers in accordance with the methods of the present invention.

Referring to FIG. 3, each node 14 generally comprises a. a hardware platform 24 (e.g., either a general purpose computer, such as a server or workstation, or a purpose-built computer with specialized hardware);

b. one or more LAN (e.g., Ethernet) interfaces (made up of physical ports 18 and associated drivers 26), used to connect to one or more LAN switches that constitute the hardware over which the virtual connectivity grid is implemented;

c. an operating system 28 (e.g., either a general purpose computer operating system, such as Windows™, Solaris™, Linux, etc., or a purpose-built operating system with specialized functions);

d. driver(s) 30*a*, 30*b*, 30*c*, etc., that create one or more virtual interfaces to connect the node 14 to the virtual connectivity grid;

e. specialized software (e.g., flow routing module 32) that performs routing of traffic flows from the node 14 to another node in the next stage of the multi-stage network, such routing being done adaptively based on a variety of static and dynamic policies relating to load sharing, performance, capacity, availability, traffic classification, etc.;

f. application software 34 that delivers the specialized functionality required of an Ingress/Egress, Application, and/or Management node; and g. a management agent (e.g., node management module 36) that receives and acts on command and control messages directed at the node 14.

As mentioned above, system nodes that perform functions relating to the routing of traffic flows to/from networks external to the connectivity grid 10 are known as Ingress/Egress Nodes or INODEs. INODEs also are often involved in the routing of traffic flows through the multi-stage network. Service nodes that perform one or more of the specialized packet processing required at each stage of the multi-stage network are known as Application Nodes or ANODEs. INODEs and/or ANODEs configured to perform flow management functions (for flow routing within the connectivity grid) may be collectively referred to as FNODEs. System nodes that perform supervisory functions relating to the command and control of the entire system, including the virtual connectivity grid, all virtual links, the ingress/egress nodes and application nodes are referred to as Management Nodes or MNODEs. A single node may include a combination of the functionality associated with an INODE, an ANODE or an MNODE. In some systems, for example, it may be more efficient to implement the system management functionality on an INODE, or the ingress/egress functionality on one or more ANODEs.

An INODE serves as the entry and/or exit point for all traffic entering and leaving the virtual connectivity grid 10. There can be any number of INODEs connected to the grid. Each INODE is associated with one or more external networks. An external network can be physical, as in an Ethernet LAN, or virtual, as in a VLAN implemented over the Ethernet LAN.

An INODE, or two or more INODEs configured as a cluster for redundancy, serves as the first and last stages of the multi-stage network. The same INODE, or a cluster of such nodes, can perform both functions (entry and exit of traffic flows) or different INODEs, or clusters of such nodes, can be used to perform one or the other function. The INODE may also include the routing capability (such as static routing or one or more routing protocols—RIP, RIPv2, OSPF, IGRP, EIGRP, BGP and others) necessary to direct the traffic flow to the appropriate next hop device connected to the external network. The routing protocols can also be implemented as a service separate from the ingress/egress of packets from/to external networks on an ANODE.

INODEs can also operate in a Layer 2 mode in which they bridge each external network to a unique internal virtual network. This allows for transparent inclusion of the virtual connectivity grid into any existing network topology.

An ANODE performs the specialized functions designated for a particular stage in the multi-stage network. A cluster of ANODEs can be created by designating two or more ANODEs to perform the same specialized function in a particular stage of the multi-stage network. Examples of such functions are packet filters, firewalls, VPN servers, intrusion detection systems, web filtering and any of the packet processing functions included in an enterprise network. All member ANODEs of a cluster are considered functionally equivalent. In other words, traffic flows designated for a particular stage in the multi-stage network can be routed to any member of the cluster.

An MNODE performs specialized functions related to the configuration, management and monitoring of the virtual interfaces 16, virtual networks 22, the virtual connectivity grid 10, and the nodes 14 connected to the grid. An MNODE also performs traffic flow monitoring functions such as collecting and exporting system-wide flow statistics such as throughput, latency, utilization and error rates, and node-specific flow statistics such as per-node latency, per-node throughput, per-node utilization, per-node error rates and per-node congestion.

Figure 4:
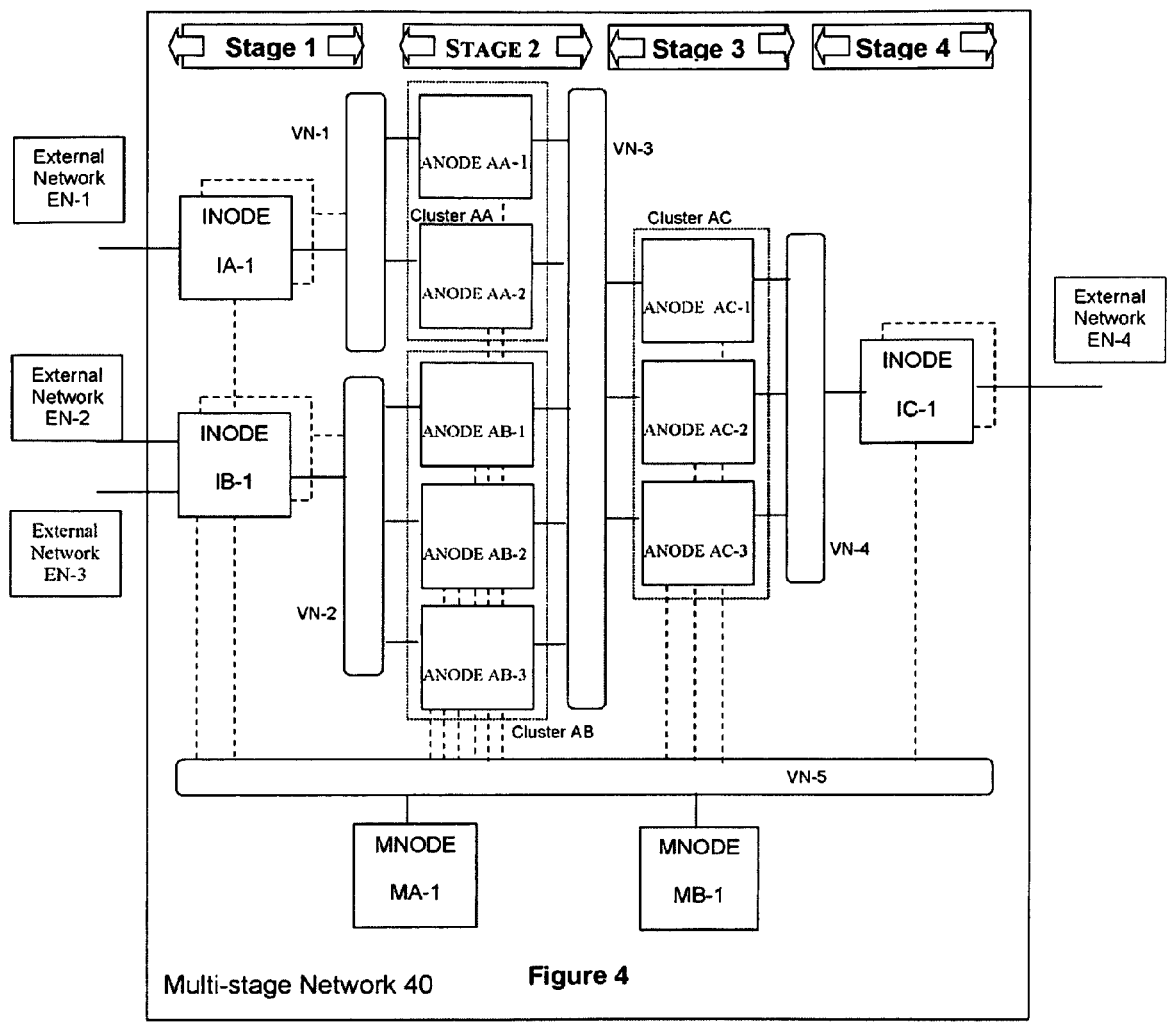
FIG. 4 illustrates a logical view of a multi-stage network constructed using nodes and a virtual connectivity grid in accordance with an embodiment of the present invention.

FIG. 4 provides a logical illustration of a sample multi-stage network 40 constructed using nodes and a virtual connectivity grid in accordance with the present invention. In particular, the illustration shows a 4-stage network consisting of:

a. Three INODES (in redundant configuration). INODEs IA-1 and IC-1 connect to one external network each, while INODE IB-1 connects to two external networks.
b. Three application clusters, AA, AB and AC. Application cluster AA has two ANODEs (AA-1, AA-2), application cluster AB has three ANODEs (AB-1, AB-2, and AB-3) and application cluster AC has three ANODEs (AC-1, AC-2, AC-3). All nodes of each cluster perform the same application function.
c. Two MNODES (MA-1 and MB-1).
d. Five virtual networks (VN-1, VN-2, VN-3, VN-4, VN-5), internal to the virtual connectivity grid.
e. Four external networks (EN-1, EN-2, EN-3, EN-4), each external network connecting to the virtual connectivity grid through an INODE. EN-1 connects through IA-1, EN-2 and EN-3 connect through IB-1, and EN-4 connecting through IC-1.

The four stages of the network may be regarded as follows: The first stage includes INODEs IA-1 and IB-1, the second comprising application cluster AA or AB, the third stage comprising application cluster AC, and the fourth stage comprising INODE IC-1. Virtual network VN-5 and the MNODEs connected to it do not represent a stage in the multi-stage network because data traffic between external networks does not flow through this virtual network. Instead virtual network VN-5 provides for command and control paths (illustrated by the dashed virtual links) to the various INODEs and ANODEs of the multi-stage network 40. Node to node communication is achieved through a set of control messages, which may be used for things such as node discovery, node status and state inquiry, node state distribution, node state and statistics data gathering or dissemination, flow route distribution, flow-specific statistics gathering and dissemination, and so on.

The virtual networks VN-1-VN-5 are created using the virtual connectivity grid discussed above. It is the virtual networks then which provide communication channels between the nodes of network 40. The information to be transmitted across these communication channels (termed virtual links in the context of the present invention) consist of packets that are organized into flows. Not any packet can be routed to any node. Instead, flows must be preserved and this is the task of the flow routing framework described below.

C. Flow Routing Framework

A flow is a series of packets that are exchanged between two entities within an application context, and can consist of several related connections. These entities are typically a client and a server, two peer applications, or a sender and one or more receivers. The application context may be a simple transaction (made up of a single request and response sequence), an application session (made up of one or more simple transactions) or arbitrary criteria that help single out the specific sequence of packets of the flow from a multiplexed stream of packets. The process of determining which nodes of a multi-stage network will process packets of a particular flow involves both flow, management and flow routing. Thus, the flow routing framework of the virtual connectivity grid includes flow management modules and flow routing modules.

Flow management, as used in the context of the present invention, involves flow classification and flow path assignment. Flow management modules then are software modules (resident in certain nodes of the multi-stage network), which perform the functions of flow classification or identification, and the assignment of a specific flow paths (made on the basis of system operator defined policies) through the virtual connectivity grid for each flow.

Flow classification is the process by which individual flows are identified within a multiplexed stream of packets. Stated differently, flow classification consists of identifying a flow based on a sequence of one or more packets. Often, the application context (e.g., in the case of well-known flows like TCP sessions, or HTTP request-response sequences) specifies the criteria used to identify the flow. In other cases, the user may define an arbitrary set of rules (also known as policies) for identifying flows. These policies may be used in conjunction with well-known application contexts to achieve greater granularity in flow classification. Flow classification then is different from packet classification. Packet classification is stateless, and the identification process involves matching a single packet against a given set of criteria that can be found within that packet. In contrast, flow classification is stateful and the identification process involves a sequence of packets that may arrive at different times, and the classification criteria may be found across several of these packets. Flow classification is performed on all INODEs and on those ANODEs that originate new flows (e.g., NAT, VPN, proxies, etc.). The module that performs this function is called the flow classification (FC) module, and the results of flow classification are two values: flow type (e.g., HTTP, FTP, etc.) and a flow ID. The flow ID is a hash of various fields within the packet that are constant for all packets in that particular flow. This hash algorithm depends on the flow type. The 5-tuple may not always be constant within a flow. For instance, an FTP data connection will have a different source port than the FTP control connection; however, both connections belong to the same flow.

Once flows have been classified, flow paths may be assigned. Flow path assignment is the process by which flows are directed to a specific path based on static or dynamic criteria. When there are several entities that are required to serially process the packets in a specified flow, as is the case in a multi-stage network, the flow path defines the sequence in which the entities process the packets. More specifically in the context of the present invention, a flow path represents a cluster-to-cluster path for packets of a given flow. Flow paths may be static (e.g., a constant sequence specified by the operator), or dynamic (e.g., determined by a set of criteria that may change in real-time), or hybrid (e.g., part of the path is specified by the operator and the rest is determined in real-time). For example, there may be two flow paths within the same multi-stage networks and flows may be selectively assigned one or the other flow path based on operator specified criteria, such as source of the flow, destination of the flow, the application that the flow is associated with, and so on.

As indicated above, flow management modules are resident in all INODEs connected to external networks from which traffic flows originate. The flow management module in each INODE performs the following functions:

a. detects the initiation of a new flow, termination of current flows, and flows that are inactive;
b. classifies a flow based on criteria or policies set by the system operator;
c. assigns a flow path to each flow based on criteria or policies set by the operator;
d. maintains a table of flows and the path assigned to each;
e. collects end-to-end flow-specific statistics such as throughput, latency, utilization and efficiency of routing;
f. provides interfaces for the collection and aggregation of end-to-end flow-related statistics; and
g. interacts with routers and other networking devices in external networks to determine the forwarding of packets that exit the virtual connectivity grid.

Depending on the application running on an ANODE, most ANODEs will initiate or terminate some secondary flows (e.g., to communicate with a RADIUS server or syslog server). Accordingly, some ANDOEs may be configured with flow management modules. However, if the traffic on the secondary flows is light relative to the total data traffic, a fixed flow path may be assigned for that flow and flow classification/routing for the secondary flow may be unnecessary. For ANODEs that initiate/terminate flows for data traffic (such as VPNs), one may perform flow classification at the ANODE or, alternatively, route the flow to an FNODE that performs such functions.

Flow routing differs from flow management. Whereas flow management is concerned with the cluster-to-cluster path of flows, flow routing is concerned with the actual node-to-node route to be taken by the packets of the flows. That is, a flow route is the specific sequence of nodes traversed by packets that belong to a particular flow. Flow routing then is the process by which packets belonging to a particular flow are forwarded to the next node in the flow route assigned to that flow.

Figure 5:
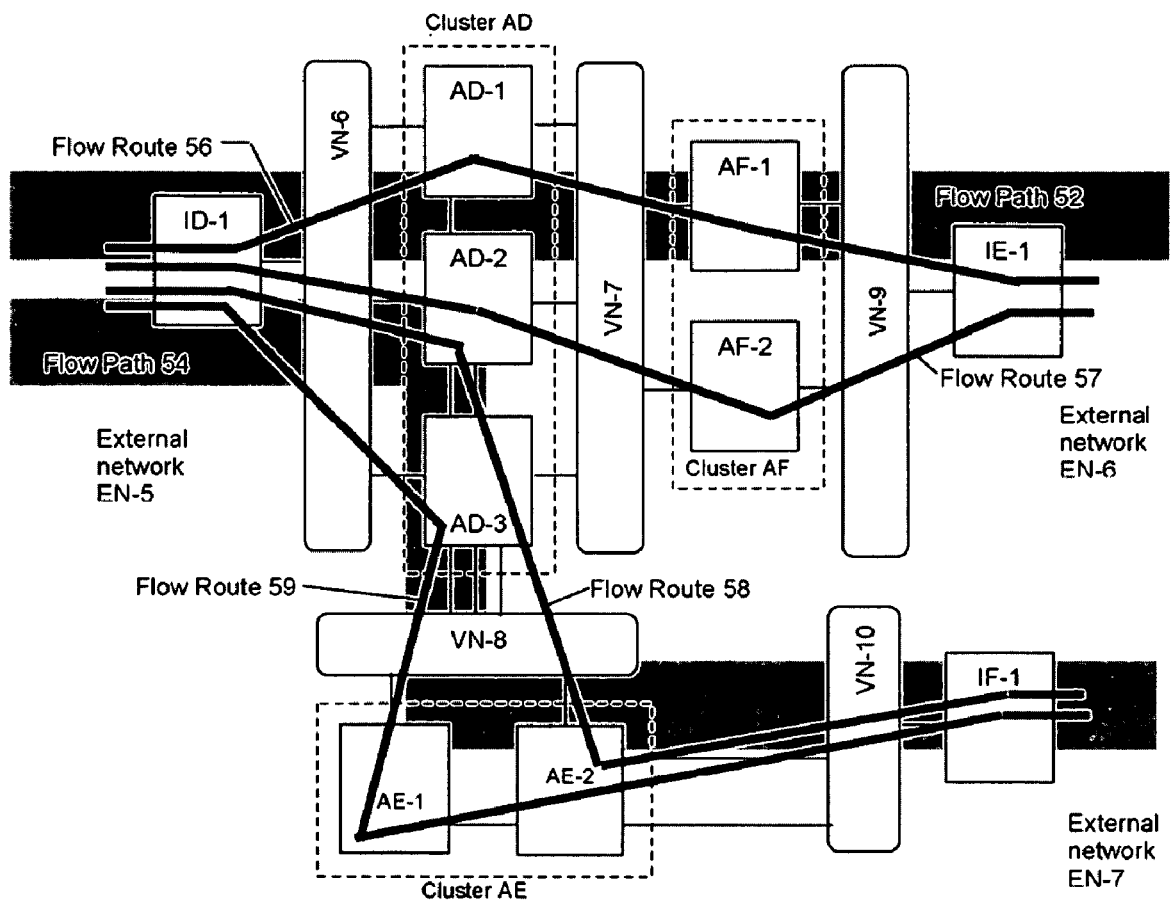
FIG. 5 illustrates the distinction between flow paths and flow routes within a multi-stage network in accordance with embodiments of the present invention.

A flow path then defines a sequence of application clusters (or virtual networks) taken by a flow, but a flow route defines a sequence of particular nodes in those application clusters (or virtual networks) to be traversed. This distinction is illustrated in FIG. 5, which shows a 3-stage network 50 with three INODEs (ID-1, IE-1, IF-1), five virtual networks (VN-6, VN-7, VN-8, VN-9, VN-10), three external networks (EN-5, EN-6, EN-7), and three applications clusters (AD, AE, AF) comprising 7 ANODEs (AD-1, AD-2, AD-3, AE-1, AE-2, AF-1, AF-2). The figure illustrates two flow paths, 52 and 54. Flow path 52 originates in external network EN-5, traverses application clusters AD and AF, and terminates in external network EN-6. Flow path 54 originates in external networks EN-5, traverses application clusters AD and AE, and terminates in external network EN-7. There are a total of twelve possible flow routes through network 50, four of which having the following node traversals are shown in the diagram:

i. ID1->AD-1->AF-1->IE-1 (flow route 56);
ii. ID-1->AD-2->AF-2->IE-1 (flow route 57);
iii. ID-1->AD-2->AE-2->IF-1 (flow route 58); and
iv. ID-1->AD-3->AE-1->IF-1 (flow route 59).

Because of the stateful nature of flows, it is essential that all packets belonging to a particular flow be forwarded to the same node (or a state maintaining backup node) that was selected to receive the first packet of that flow. Also, because flows are bidirectional and symmetric, all packets belonging to a particular flow moving in the reverse direction must be sent to the same node from which these packets were received in the forward direction. To accommodate these requirements, each node may maintain a routing table with an entry for each flow. The entry is created when the initiation of a new flow is detected, and is deleted when the termination of that flow is detected. In order to ensure that the reverse path of the packets is same as the forward path of the packets within a flow, each egress point in the system as well as ANODES that terminate flows (e.g., NAT, VPN, proxies, etc.) must maintain the state associated with each flow and ensure that either the flow ID is identical to the forward path or the flow route is identical to the forward path. These parameters are discussed further below.

The flow routing tables are a component of flow routing modules resident in all INODEs and ANODEs connected to the virtual connectivity grid that are part of a flow path. The primary function of these software modules is the adaptive and reliable routing of data packets belonging to a specific data flow to a node in the next stage of the multi-stage network, taking into account the prevailing conditions of the neighboring nodes. The flow routing module in each INODE or ANODE node performs the following functions:

a. detects the initiation of a new flow, the termination of existing flows, and also identifies inactive flows;
b. selects the next hop node for the forward direction of a new flow (there are several methods that can be used for next-hop node selection: round robin, weighted round robin, algorithms based on the number of active flows, algorithms based on real-time feedback from the available next-hop nodes, etc.);
c. maintains a routing table for all active flows managed by the node:
  i. creates an entry for each new flow, as defined by the unique set of source & destination IP address, source & destination port numbers, and protocol identifier (5-tuple);
  ii. stores the MAC address of the node from which the flow was received (this is needed for forwarding packets in the reverse direction of the flow);
  iii. stores the MAC addresses of the nodes to which the flow is designated to be replicated;
  iv. deletes the entry when the flow terminates, or when a timeout expires indicating an inactive flow;
d. forwards flow creation and deletion notifications to downstream and sibling nodes;
e. forwards packets to the next-hop node;
f. if the flow is selected for replication, forwards the packet to one or more additional designated nodes;
g. maintains flow-specific and aggregate statistics on throughput, latency, packet counts, byte counts, etc.;
h. forwards status information to neighboring nodes, including sibling nodes;
i. participates in node discovery;
j. receives and processes status information from neighboring nodes, including sibling nodes;
k. provides call back interfaces for collection and aggregation of flow-specific and node statistics; and
l. re-routes flows around node failures and node congestion.

There are several application specific and transport protocol specific mechanisms for identifying the initiation and termination of flows. For example, for TCP based flows the sequence of packets exchanged for TCP connection establishment provides the indication of flow initiation, and the sequence of packets exchanged for TCP connection termination provide the indication for flow termination. In the case of connectionless transport protocols, such as UDP, the first packet with a new set of source and destination IP addresses, source and destination UDP port numbers and application protocol identifier, can be used to determine the initiation of a new flow. In the case of connectionless protocols, there is no explicit sequence of packets, at the transport layer, to indicate the termination of the flow. In such cases, flow initiation and termination can be more deterministically detected using information exchanged by session-layer or application-layer protocols.

Flow routing can be adaptive or static. Adaptive routing is the process by which a node selects the next hop node, from a list of functionally equivalent nodes, to which all packets of a particular flow will be forwarded based on dynamically changing metrics, such as node resource utilization. Static routing is a type of flow routing in which the next hop decision is based on packet parameters, such as flow ID and packet type. In either case, next hop selection typically occurs at the time a new flow is detected, and/or when the flow needs to be re-routed midstream. Operational conditions of nodes, such as node failure and congestion, may trigger such re-routing.

Next hop node selection can be centralized or distributed. In a centralized architecture, a designated node, such as the INODE that acts as the entry point for the flow into the virtual connectivity grid, sets up an end-to-end route for the flow. This is analogous to setting up a circuit that will be used for all packets belonging to a flow, for the duration of that flow. In a decentralized or distributed architecture, each node makes a local determination of which node to use as the next hop. This is analogous to hop-by-hop packet routing.

Regardless of whether centralized or distributed next hop selection is used, a flow type and Topology ID are encoded in each packet at the ingress node. In addition, either a flow ID or flow route is encoded in the packet, depending on whether distributed next hop selection or centralized next hop selection (respectively) is used. The flow type parameter is used mainly for statistics. The topology ID parameter encoded in the packet is that which was current when the flow was created. This can be a useful reference when the topology changes and existing flows need to be handled differently due to the change.

Two additional bits of information are also encoded in the packet: start of flow and end of flow bits. These bits can be used by other nodes in the multi-stage network to create or delete state information. However, a node should not solely rely on these bits as it may not always be possible to identify start or end of a flow.

The flow type, topology ID, flow ID/flow route, and start/end of flow parameters are part of a packet's flow descriptor. As alluded to above, flow descriptors provide an in-band mechanism for the distribution of networking parameters associated with virtual link connectivity and flow management. They may also support security elements to help prevent spoofing attacks. Each packet within the virtual connectivity grid will carry a flow descriptor.

The flow descriptor may be stored in each packet within the packet's MAC, VLAN, or IP headers. That is, information that is unused in these headers can be replaced with the flow descriptor for the duration of time that the packet is being processed within the multi-stage network. The displaced information would need to be retained for reinsertion upon packet egress or in case one or more nodes (i.e., application programs running at those nodes) require the information. Possible fields within these headers that can be used for this purpose include:

| | |
|---|---|
| a. MAC: | use some of the bits from the 16-bit "type" field |
| b. VLAN: | use up to 4 bits of the "VLAN priority" field |
| c. IP: | use 16-bits of the "checksum" field, and/or 3 to 4 bits of the "version" field. |

Alternatively, one may insert the flow descriptor into each packet either between the VLAN tag header and the IP header, or at the end of the packet. This can be done if the Ethernet drivers on all nodes and switches within the multi-stage network can accommodate packets larger than the conventional Ethernet size (for example if the nodes and switches accommodate Ethernet jumbo frame). Such information will need to be removed before the packet egresses the network.

In the case where the flow descriptor is appended to the end of a packet, it is preferably hidden from applications as the packet traverses the various nodes. The flow descriptor may be visible with a virtual probe after appropriate authentication. One example of fields for a flow descriptor to be appended to a packet is provided below, in Table 2.

TABLE 2

Flow Descriptor Fields

| Description | Byte Count |
|---|---|
| Marker and version | 2 |
| Length | 1 |
| Checksum | 2 |
| Packet signature | 8 |
| Original MAC | 12 |
| Flags (e.g., start of flow, end of flow, etc.) | 1 |
| System state version (topology ID) | 1 |
| Flow type | 2 |
| Flow ID | 4 |
| Flow Assignments List: | |
| List count | 1 |
| List elements (each of the form): | 2*List Count |
| Cluster ID (1 byte) | |
| Cluster element ID (1 byte) | |

On ingress into each node along the flow route, the original MAC address will be restored into the packet header before handing the packet to the upper layer protocols. Before a packet egress from a node, the MAC headers (including the source/destination MAC addresses and VLAN tags) may be modified. The original MAC headers are saved in the flow descriptor.

Cluster data for each cluster of nodes includes the node ID of the assigned node for that cluster. In addition, a bit may also be set to indicate that the specific cluster has processed the packet. This can be done for two purposes: First, it can be used to detect packet loops within the system. Second, it can be used by an FNODE in metering the number of flows being processed by each node in the cluster.

Where distributed next hop selection is used, flow paths will not be pre-determined, but will be determined at each node by the application running on that node. Hence the assignment of flow paths will be done at each node by the respective application. When a new flow is detected (e.g., by the INODE that receives to new flow from an external network, or an ANODE that initiates a new secondary flow), the flow classification module at the detecting node will assign a unique flow ID to the new flow and save that designator in its local table. As other packets associated with this new flow are detected, the flow classification module may then insert the new flow ID into all packets of the corresponding flow so other nodes in the flow path can retrieve the flow ID and not have to perform flow classification. The flow ID may be, in some embodiments, a 24-bit value, allowing for a maximum of 16 million simultaneous flows.

At each ANODE or INODE that receives packets of the new flow a flow mapper module extracts the flow descriptor from the incoming packet and sanitizes the packet by restoring the original header values. The flow ID is saved so that it can be re-inserted into the packet before the packet is sent to the next hop in the flow path. In some cases, this may require saving packet information (such as the 5-tuple) along with the flow information (e.g., in a local table) and identifying the corresponding outbound packet to reinsert the flow descriptor. The table can be relatively small as the entries need only be maintained for the duration of time the packet is being processed at a particular node.

Before the node sends out the packet, it selects the node for the next hop (e.g., the selection may be performed by the flow mapper at the node). In the case of static load balancing, this may be done simply by hashing the flow ID into a value form 1 to "n", where n is the number of nodes in the next cluster. Since the flow ID is the same for all packets within a flow, the next hop will be the same for all packets within that flow. Thus, a node need not maintain a table or other data structure for flow next hops. If, however, adaptive load balancing is to be used, a state table for all active flows will need to be maintained at each node as well as a flow next hop table.

In order to ensure the correct flow of packets in the reverse direction, a node can employ one of the following algorithms a. The node maintains a table of all active flows and the MAC address of the previous hop for that flow (this is the source Ethernet address in the packet). This is done for every packet. The flow mapper does not need to know when a new flow starts or ends. If an entry already exists for that flow ID, then that entry is simply overwritten. The flow mapper needs to maintain the next hop MAC address in both directions. Such an algorithm will need to be used if adaptive routing is used.

b. The node determines the next hop by simply hashing the flow ID into a value from 1-n, when n is the number of nodes in the next cluster in the reverse direction (or the previous cluster in the forward direction). It does not need to maintain any table of flows. This approach can be used in the case of static flow routing.

The next hop selection process uses the value of it that was valid when the flow was first created. This ensures that even with changes of topology, the existing flows are still routed to same nodes. Of course, each node needs to maintain the current as well as the previous topologies to track the value of "n" when the flow was created. This is the reason to include the topology id associated with the flow with each packet.

Where centralized next hop selection is used, the INODE which receives a new flow from an external network selects a node in each cluster that may process this specific flow. Since it is not known to the INODE what clusters the packet will actually flow through, the next hop selection is done for all clusters in the system, even though the packet may not traverse every cluster. That is, a node in each cluster of the multi-stage network is reserved for handling each flow, even if the flow will not utilize any nodes in that cluster. The selected node for each cluster (the flow route parameter discussed above) is encoded in the packet, along with any additional flow information such as flow type and topology id.

The INODE selects the next hop for each cluster based on the information it has about the load on the individual nodes in each cluster. Any of a number of load balancing techniques may be used. For example, simple round-robin or weighted round robin load balancing may be used, or more complex schemes that rely on feedback from the nodes as to actual and current loads and/or flow types may be used. Preferably, the load balancing decisions are made on the basis of end-to-end characteristics for a flow. These characteristics may be communicated to the INODEs through the flow mappers present in each of the nodes. Once the selection is made at the flow creation time, this selection is saved in a table and all future packets for the same flow use the same nodes in each cluster.

Sometimes, flow replication may be necessary. Flow replication is the process by which an exact replica of a flow (a clone) is created and a distinct flow path is created for the replicated flow. This path may contain a different sequence of entities than those contained in the original flow path. Flow replication facilitates the testing of new flow paths, new or different versions of entities (e.g., nodes) in a given flow path, or new policies.

When a node in the system fails, all other nodes in the system are notified of the failure. This may be done by the MNODE sending a topology update notification to all nodes in the system. New flows started after the failure of a node will not use the failed node and instead will be handled by the remaining nodes in the affected cluster. Similarly, existing flows that did not include the failed node will not be affected. However, existing flows that did include the failed node in their paths will need special handling. The following are some strategies for handling such events:

- a. Discard packets for existing flows. This approach is based on the assumption that the failed node maintained some application-specific state that is not present in other nodes of the same cluster. Hence, even if packets of the flow were redirected to another node in the affected cluster, the packets would be likely to be dropped.
- b. Redirect packets to another node in the affected cluster. This process may be used where the failed node did not maintain any application-specific state about the flow and, therefore, other nodes can handle packets from the affected flow.
- c. Use a backup node for each node in the cluster. In this approach one assumes that some or all nodes will maintain application-specific state information for some or all of their respective flows, however, such state information is determined solely by the packets in the flow. Every node in a cluster (called a primary node for a respective flow) is assigned a backup node. All packets that are received and processed by the primary node will also be received and processed by that node's backup node. However, the backup node need not send the processed packets (or information resulting from the processing of the packets) further in the flow path. Instead, the backup node drops each packet (i.e., sends no output), unless it detects or is informed of a failure of the primary node. In such circumstances the backup node becomes the primary node for the affected flow and stops dropping packets. In effect, the backup node seamlessly takes over the flow path from the failed primary node and continues in this role until the flow terminates. This is true even if the original primary node subsequently becomes available again because that node will have lost its state information for the flow. Note that when the topology changes (e.g., due to a node failure), the backup node for a specific primary node may also change and therefore in order to keep track of which node is an assigned backup node for a particular flow, a topology ID needs to be associated with the flow ID. In this way, nodes can keep track of their assigned backup roles on a flow-by-flow basis.

D. System Management Framework

The system management framework enables an operator to:

- a. perform system configuration operations, such as:
  - i. install, upgrade and maintain software on system and service nodes;
  - ii. synchronize software and configuration changes across two or more nodes;
  - iii. create and maintain service or application clusters, increase or decrease processing capacity;
  - iv. create and maintain virtual network topologies;
  - v. create and maintain interconnections to external networks;
  - vi. create and maintain flow paths;
  - vii. replicate node environments, including software and configuration;
  - viii. create test environments for any part of the system;
  - ix. set up meters & monitoring facilities for any part of the system; and
  - x. manage the deployment and use of spares.
- b. perform system, element, and traffic monitoring operations, such as:
  - i. monitor status of the overall system, application clusters, individual nodes and software elements;
  - ii. monitor data traffic at the system level, element level, network level, etc.; and
  - iii. monitor flow-specific status and statistics.
- c. perform diagnostics and troubleshooting operations, such as:
  - i. analyze flow traffic trends;
  - ii. analyze trends in key metrics like throughput, latency, utilization at the system, cluster, element, network and flow levels; and
  - iii. analyze error conditions, performance anomalies, system bottlenecks.

The system management framework comprises:

- a. one or more system management nodes (MNODEs) connected to the virtual connectivity grid;
- b. node management agents running in each node connected to the virtual connectivity grid,
- c. one or more virtual networks internal to the virtual connectivity grid to which MNODEs, INODEs and ANODEs connect for the purpose of communicating with each other;
- d. a set of communication messages exchanged between the node management agents resident in nodes, and one or more system management nodes, all connected to an internal management network;
- e. a suite of management applications, that run on one or more workstation or server platforms outside the virtual connectivity grid, constituting the management consoles for operator use;
- f. one or more external networks that connect the management consoles to a designated MNODE on the virtual connectivity grid, such MNODE providing the system management interface to the console;
- g. a set of communication messages exchanged between the management consoles and the MNODE providing the system management interface;
- h. optionally, third-party management applications (e.g., Tivoli, HP OpenView, Calif. Unicenter, Micromuse NetCool etc.,) that run on workstation or server platforms connected to external networks; and
- i. a set of communication messages exchanged between the third-party management applications and the MNODE providing the system management interface for purposes of exporting system management related data from the MNODE to the third-party applications.

Figure 6:
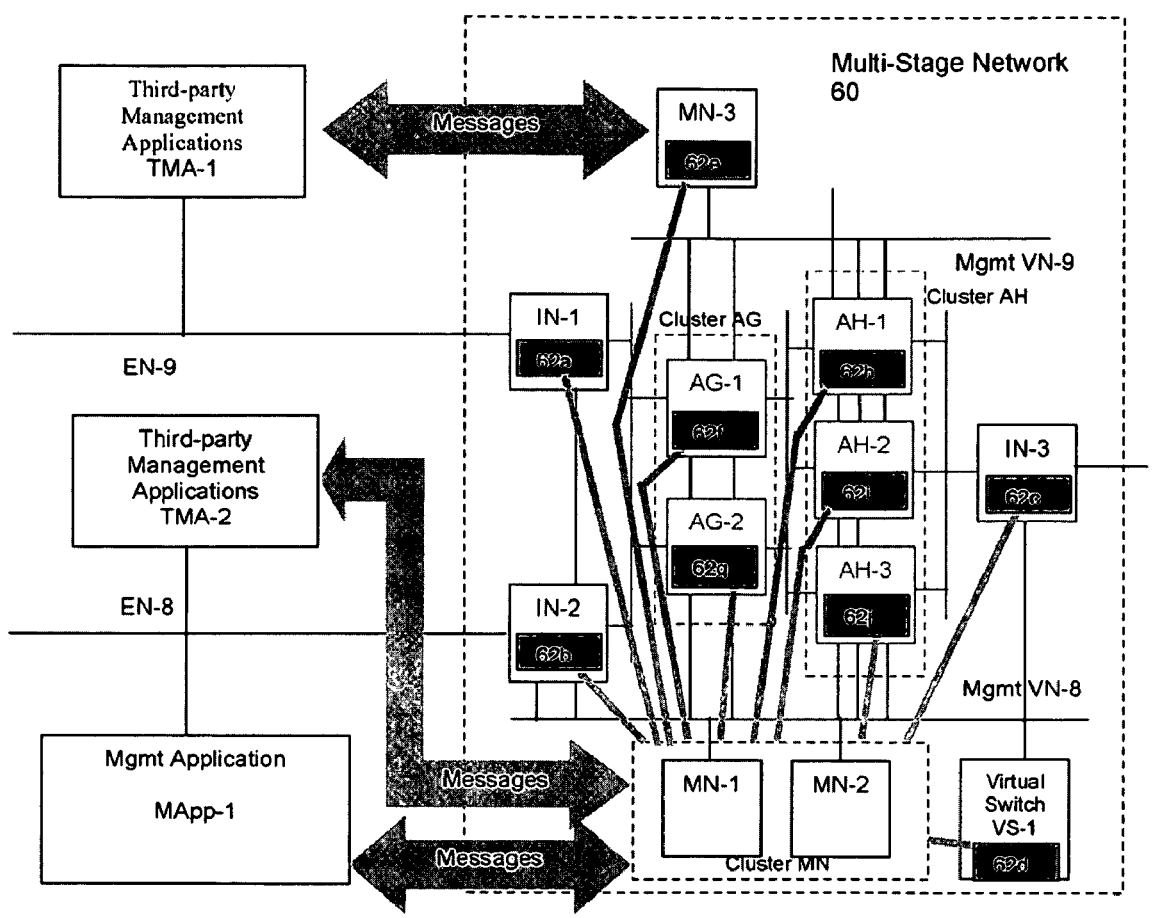
FIG. 6 illustrates an example of a system management framework configured in accordance with an embodiment of the present invention.

FIG. 6 illustrates an example of a system management framework configured in accordance with an embodiment of the present invention. The system management interface is provided by a redundant set of MNODEs, MN-1 and MN-2, configured as a cluster MN. These nodes are connected to the internal management virtual network, VN-8. All the INODEs (IN-1, IN-2 and IN-3) and ANODEs (AG-1, AG-2, AH-1, AH-2, AH-3) are also connected to this network. Resident in each INODE and ANODE is a management agent 62 that uses the internal management network VN-8 to exchange messages to peer management agents as well as the system management node cluster MN comprising the two MNODEs (MN-1 and MN-2).

The figure also shows a network management application (MApp-1) running on a workstation or server platform connected to external network EN-8 and exchanging messages with the system management node cluster MN. The system management framework can also be extended by adding third-party components: Thus, a third-party network management application TMA-2 is also connected to external network EN-8 and likewise communicates with the system management node cluster MN.

In addition to the system management node cluster MN, a third party management node MN-3, under the control of a third party management application TMA-1 via a connection through external network EN-9 is also present. Note that the third-party management nodes may be managed within the services connectivity grid just as any other ANODE or INODE, and contain node management agents.

E: System Implementation

The system described above, comprising a virtual connectivity grid, a plurality of system and service nodes, a flow routing framework and a system management framework may be implemented on commercially available hardware. As indicated above, the virtual connectivity grid may be overlaid on conventional Ethernet switches that support VLANs. The system and service nodes may be implemented on conventional computer workstation or server computers running conventional operating systems with the addition of specialized software for connecting the node into the services connectivity, flow routing and system management frameworks. These frameworks are represented by agents or software that runs in each node and, where appropriate, external computers, and a set of communication messages exchanged between those entities.

Figure 7:
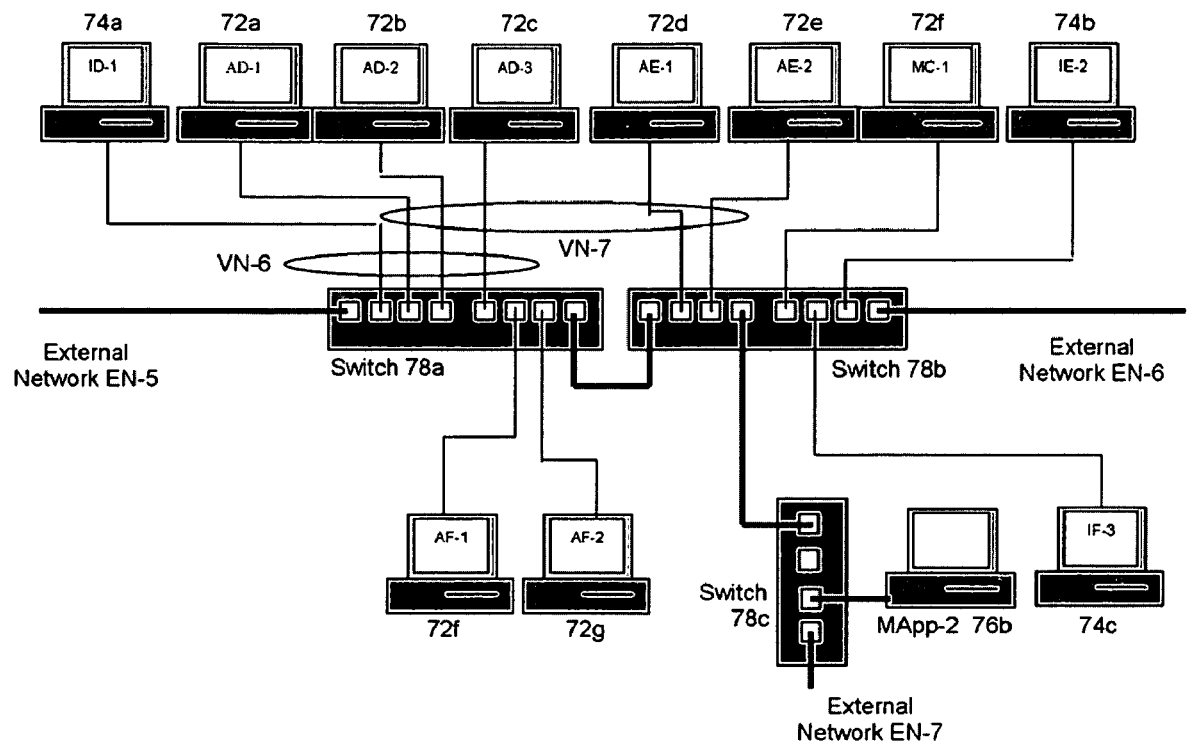
FIG. 7 illustrates one configuration for implementing the logical characteristics of the multi-stage network shown in FIG. 5 using conventional LAN switches and workstations.

By way of example, FIG. 7 illustrates how the logical system topology shown in FIG. 5 can be implemented using commercially available LAN switches and workstations or servers. The network 70 is made up of a collection of workstations/servers 72a-72g, which are configured to perform the functions of the various ANODEs as indicated. That is, workstation 72a is configured to operate as ANODE AD-1, workstation 72b is configured to operate as ANODE AD-2, and so on. Workstations 74a, 74b and 74c are configured to operate as INODEs ID-1, IE-1 and IF-1, respectively. Although not shown in FIG. 5, it should be appreciated that certain MNODEs are needed to provide the system management framework and so illustrated in FIG. 7 is an MNODE MC-1 and an external management application MApp-2. These MNODEs may be computer systems 76a and 76b, respectively, configured to perform the management functions.

The various workstations/servers are coupled to LAN switches 78a, 78b and 78c as shown. These physical connections are made using conventional Ethernet connections over which are created the virtual interfaces and virtual networks discussed above to achieve the logical topology illustrated in FIG. 5. The virtual networks VN-6 and VN-7 are illustrated but the others are not in order not to unnecessarily obscure the figure. Although three physical LAN switches 78a-78c are shown, it should be appreciated that a single switch having a sufficient number of ports could have been used, or, alternatively, two or more such switches could have been interconnected.

Many of the vendors that build stand-alone, general purpose server hardware are now offering these servers in a new form factor called the Blade Server. A blade server comprises a highly redundant and fault-tolerant chassis, with several slots designed to house single-board computers providing the same or similar performance capabilities as the stand-alone general-purpose computers. All of the blades are interconnected using a high-speed switch, which is part of the blade server system configuration. The primary target application for the blade servers is server consolidation, with the attendant benefits of cost, power and space savings. The blade server form factor enables the operator to deploy a significantly larger amount of server capacity or compute capability at much lower cost, power consumption and space consumption than what is offered by current alternatives. This makes the blade server an ideal form factor for large data centers.

Figure 8:
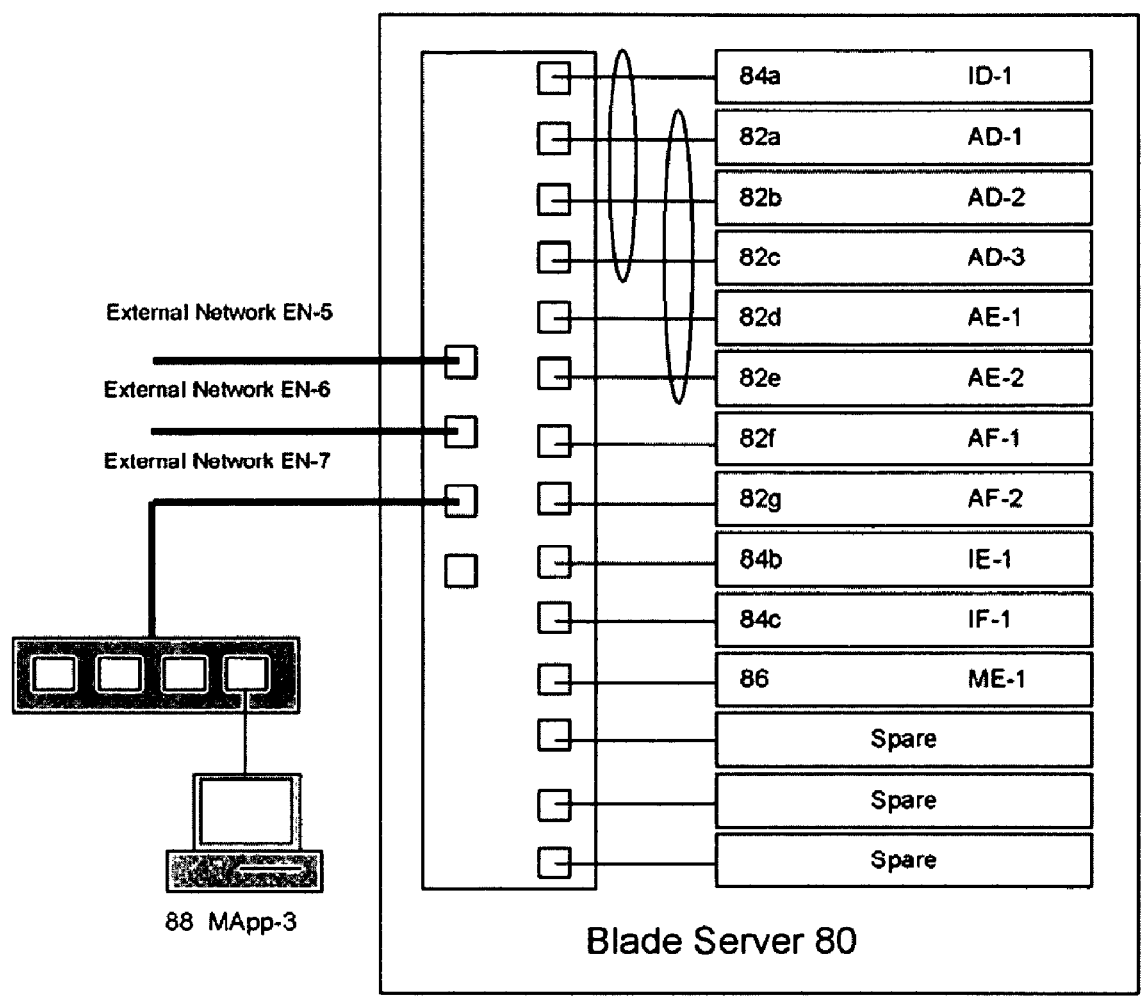
FIG. 8 illustrates another configuration for implementing the logical characteristics of the multi-stage network shown in FIG. 5 using a blade server platform.

FIG. 8 illustrates an implementation of the logical topology shown in FIG. 5, using a typical blade server chassis. The blade server 80 is made up of a collection of single board computers 82a-82g, which are configured to perform the functions of the various ANODEs as indicated. That is, single board computer 82a is configured to operate as ANODE AD-1, single board computer 82b is configured to operate as ANODE AD-2, and so on. The single board computers are all housed in a common chassis.

Single board computers 84a, 84b and 84c are configured to operate as INODEs ID-1, IE-1 and IF-1, respectively. The MNODEs needed to provide the system management framework are MNODEs ME-1 (implemented as a properly configured single board computer 86) and MApp-3 (implemented as workstation 88).

The various single board computers are coupled to a high speed switch 90 within the blade server 80, as shown. These physical connections are made using a conventional blade server backplane, over which are created the virtual interfaces and virtual networks discussed above to achieve the logical topology illustrated in FIG. 5. The virtual networks VN-6 and VN-7 are illustrated but the others are not in order not to unnecessarily obscure the figure.

Thus, methods and systems for adaptively routing packet flows in a multi-stage data network that includes various packet processors (nodes) that perform specialized functions at each stage have been described. As indicated above, the present invention, in various embodiments, provides a flexible connectivity grid, adaptive flow management and adaptive resource provisioning. These attributes can be implemented generally on conventional and commercially available hardware running heterogeneous software. Nevertheless, although the present invention has been discussed with respect to certain illustrated embodiments thereof, the scope of the invention should only be measured in terms of the claims, which follow.

What is claimed is:

1. A system comprising a virtual connectivity grid overlaid on a physical network in which nodes are coupled to one or more physical switches through respective physical interfaces, the virtual connectivity grid including virtual interfaces overlaid over the node physical interfaces so as to provide communicative coupling of the nodes to one or more virtual networks established within the virtual connectivity grid, the communicative coupling being established by virtual links arranged so as to emulate physical connections in a desired connectivity pattern, wherein the system is implemented using a plurality of stand-alone general purpose and/or special purpose computers having software stored therein as the nodes and local area network (LAN) switches that support virtual local area networks (VLANs) and jumbo frames as the one or more physical switches, the software comprises flow management software configured to cause the computers to adaptively route data flows through a multi-stage network defined by the virtual connectivity grid, and each stage of the multi-stage network comprises a cluster of similarly configured applications performing one or more network services.

2. The system of claim 1, wherein each of the nodes includes a flow management module configured to manipulate packets transmitted within the virtual connectivity grid by modifying information contained in the packets to reflect flow management decisions.

3. The system of claim 2, wherein the flow management decisions are made in a centralized fashion and on a flow-by-flow basis within the virtual connectivity grid at those of the nodes which are coupled to one or more external networks and which receive flows from the one or more external networks.

4. The system of claim 3, wherein the packets are manipulated by appending information specifying flow routing decisions.

5. The system of claim 3, wherein the packets are manipulated by replacing previously encoded information within the packet with new information specifying flow routing decisions.

6. The system of claim 3, wherein the packets are manipulated by adding network topology state information to the packets, the network topology state information reflecting the communicative coupling of the nodes.

7. The system of claim 3, wherein the packets are manipulated by adding authentication information.

8. The system of claim 3, wherein flow path decisions are mode without knowledge of which of the nodes a particular flow will actually traverse.

9. The system of claim 1, wherein at least one of the computers stores resource management and provisioning software and remaining ones of the computers store provisioning agent software that is configured to cause the remaining ones of the computer to adaptively provision a required capacity of one or more network services as driven by application demand, network performance or application response time.

10. The system of claim 9, wherein provisioning is performed via human interaction through a graphical user interface using icons that represent the nodes and the virtual interfaces and creating interconnections between them.

11. The system of claim 9, wherein provisioning is performed via human interaction through a programmatic interface using data records that provide attributes of the nodes and the virtual interfaces and specifying desired interconnections between them.

12. The system of claim 1, wherein the virtual connectivity grid is implemented using one or more blade servers, each blade of the blade servers being one of the nodes and storing software.

13. The system of claim 12, wherein the software comprises flow management software configured to cause processors of the blades to adaptively route data flows through a multi-stage network defined by the virtual connectivity grid and wherein each stage of the multi-stage network comprises a cluster of similarly configured applications performing one or more network services.

14. The system of claim 12, wherein at least one of the blades stores resource management and provisioning software and remaining ones of the blades store provisioning agent software that is configured to cause processors of the remaining ones of the blades to adaptively provision a required capacity of one or more network services as driven by application demand, network performance or application response time.

15. The system of claim 14, wherein provisioning is performed via human interaction through a graphical user interface using icons that represent the nodes and the virtual interfaces and creating interconnections between them.

16. The system of claim 14, wherein provisioning is performed via human interaction through a programmatic interface using data records that provide attributes of the nodes and the virtual interfaces and specifying desired interconnections between them.

17. The system of claim 1 wherein the virtual connectivity grid is implemented using one or more blade servers and one or more stand-alone general purpose and/or special purpose computers as the nodes and one or more local area network (LAN) switches that support virtual local area networks (VLANs) and jumbo frames, external to the blade servers, as the one or more physical switches.

18. The system of claim 17, wherein each of the blades and the computers stores flow management software configured to cause processors of the blades and the computers to adaptively route data flows through a multi-stage network defined by the virtual connectivity grid and wherein each stage of the multi-stage network comprises a cluster of similarly configured applications performing one or more network services.

19. The system of claim 17, wherein at least one of the computers or the blades stores resource management and provisioning software and remaining ones of the computers and/or the blades store provisioning agent software that is configured to cause the remaining ones of the computers and/or processors of the blades to adaptively provision a required capacity of one or more network services as driven by application demand, network performance or application response time.

20. The system of claim 17, wherein provisioning is performed via human interaction through a graphical user interface using icons that represent the nodes and the virtual interfaces creating interconnections between them.

21. The system of claim 17, wherein provisioning is performed via human interaction through a programmatic interface using data records that provide attributes of the nodes and the virtual interfaces and specifying desired interconnections between them.

22. A method, comprising establishing a virtual connectivity grid configured to permit arbitrary interconnections among a first number of computer systems within a computer network, each of the computer systems being communicatively coupled to respective ports of one or more physical network switching devices, through a second number of virtual links that emulate physical network connectivity mechanisms as a result of configurations of one or more virtual networks (VLANs) overlaid on ports of the physical network switching devices wherein at least one of the virtual links emulates, in a fully switched environment, a switch that provides multi-access, broadcast capable connectivity to a plurality of the computer systems while providing unicast traffic isolation.

23. The method of claim 22, wherein at least one of the virtual links emulates, in a fully switched environment, a cable that provides point-to-point connectivity between two of the computer systems.

24. The method of claim 23, wherein the point-to-point connectivity is unidirectional.

25. The method of claim 23, wherein the point-to-point connectivity is bidirectional.

26. The method of claim 22, wherein at least one of the virtual links emulates, in a fully switched environment, a cable that provides point-to-multipoint connectivity between a root one of the computer systems and a plurality of leaf ones of the computer systems.

27. The method of claim 26, wherein the point-to-multipoint connectivity is unidirectional.

28. The method of claim 27, wherein the point-to-multipoint connectivity is bidirectional.

29. The method of claim 22, wherein at least one of the virtual links emulates, in a fully switched environment, a hub that provides multi-access, broadcast capable connectivity to a plurality of the computer systems, each operating in either a promiscuous or non-promiscuous mode.

30. The method of claim 22, wherein at least one of the virtual links emulates a transparently bridged connection between a network external to the virtual connectivity grid and a plurality of the computer systems, the bridged connection providing data patch transparency for interactions between devices within the network external to the virtual connectivity grid and the plurality of the computer systems.

31. The method of claim 22, wherein prior to transmission across at least one of the virtual links a packet is modified so as to have its original header information contained therein appended to an end of the packet.

32. The method of claim 31, wherein prior to transmission across the at least one of the virtual links the packet is further modified so as to have new header information substituted for the original header information.

33. The method of claim 32, wherein the new header information includes flow path decision information for the packet within the virtual connectivity grid.

34. The method of claim 31, wherein authentication information is appended to the packet, the authentication information serving to identify which of the computer systems is transmitting the packet.

35. The method of claim 22, wherein upon reception at one of the computer systems a packet has its original header information restored with original header information for the packet that is appended to an end of the packet.

* * * * *